(12) United States Patent
Shih et al.

(10) Patent No.: US 9,480,960 B2
(45) Date of Patent: Nov. 1, 2016

(54) PROCESS FOR PREPARING PHASE CHANGE MICROCAPSULE HAVING THERMALLY CONDUCTIVE SHELL

(71) Applicant: NATIONAL CHUNG SHAN INSTITUTE OF SCIENCE AND TECHNOLOGY, Longtan Township (TW)

(72) Inventors: Yen-Feng Shih, Taichung (TW); Yi-Hsiuan Yu, Tao-Yuan (TW); Yen-Lin Tseng, Nantou (TW); Hou-An Hsieh, Tao-Yuan (TW)

(73) Assignee: NATIONAL CHUNG SHAN INSTITUTE OF SCIENCE AND TECHNOLOGY (TW)

(*) Notice: Subject to any disclaimer, the term of this patent is extended or adjusted under 35 U.S.C. 154(b) by 0 days.

(21) Appl. No.: 14/556,539

(22) Filed: Dec. 1, 2014

(65) Prior Publication Data
US 2016/0151757 A1   Jun. 2, 2016

(51) Int. Cl.
| | | |
|---|---|---|
| *B32B 5/16* | (2006.01) | |
| *C09K 5/00* | (2006.01) | |
| *B01J 13/14* | (2006.01) | |
| *C09K 5/06* | (2006.01) | |

(52) U.S. Cl.
CPC . *B01J 13/14* (2013.01); *C09K 5/06* (2013.01)

(58) Field of Classification Search
CPC .... C08K 9/10; A61K 8/11; A61K 2800/412; A61K 47/488; A61K 51/1244; F28D 20/023; F28D 2020/0004; F28D 20/0056; F28D 20/025; Y02E 60/145; Y10T 428/2989; Y10T 428/2984; Y10T 29/49146
USPC ........ 428/402–402.24, 403, 404, 407, 321.1, 428/474.4; 427/331, 389.9, 212, 427/213–213.36, 483, 256; 264/534, 5, 41, 264/4–4.7; 424/400, 408, 450, 451, 455, 424/93.7, 184.1, 497, 489, 501, 490, 491, 424/492, 493, 494, 495
See application file for complete search history.

(56) References Cited

U.S. PATENT DOCUMENTS

| | | | | |
|---|---|---|---|---|
| 8,587,945 B1* | 11/2013 | Hartmann | .......... | H05K 7/20454 361/679.53 |
| 2010/0003518 A1* | 1/2010 | Grey | ........................ | B01J 13/14 428/391 |
| 2012/0202695 A1* | 8/2012 | Toledano | ................. | A61K 8/11 504/359 |
| 2013/0264513 A1* | 10/2013 | Yu | ............................. | C09K 5/02 252/68 |

* cited by examiner

*Primary Examiner* — James J Seidleck
*Assistant Examiner* — S. Camilla Pourbohloul
(74) *Attorney, Agent, or Firm* — Schmeiser, Olsen & Watts, LLP

(57) ABSTRACT

A process for preparing a phase change microcapsule having a thermally conductive shell is introduced. The thermal conductivity of the encapsulation materials for the phase change microcapsules is increased by adding thermally conductive nano-materials. The vinylsilane compound is polymerized with the acrylic monomer to form the copolymer first, and then the thermally conductive inorganic material is added. Thereafter, the phase change microcapsule having the phase change material as the core and the thermally conductive material-containing copolymer as the shell is prepared. The polar functional groups on the surface of the thermally conductive inorganic material condense with the vinylsilane compound to form chemical bonding, thereby substantially increasing the compatibility between the thermally conductive inorganic material and the copolymer. Therefore, the thermally conductive material can be dispersed stably during the encapsulation of the microcapsules, and the phase change microcapsule having the thermally conductive shell can be obtained successfully.

11 Claims, 4 Drawing Sheets

PROCESS FOR PREPARING PHASE CHANGE MICROCAPSULE HAVING THERMALLY CONDUCTIVE SHELL

FIELD OF TECHNOLOGY

The present invention relates to a process for preparing a phase change microcapsule that adds a thermally conductive nano-material in the encapsulation material and, more particularly, to a process for preparing a phase change microcapsule that adds a thermally conductive nano-material having high thermal conductivity in the encapsulation material. The vinylsilane compound is polymerized with the acrylic monomer to form a copolymer first, and then the thermally conductive inorganic material is added to prepare the phase change microcapsule having the phase change material as the core and the thermally conductive material-containing copolymer as the shell, thereby achieving the purpose of preparing the phase change microcapsule having the thermally conductive shell.

BACKGROUND

The phase change materials (PCM) are known to be materials that can change from a solid phase to a liquid phase or from a liquid phase to a solid phase, and during the phase change, a substantially amount of latent heat is absorbed or released. The most important feature of the phase change material is that when a great amount of latent heat is absorbed or released, the temperature of the phase change material system may be kept constant or within little variation. In the application of the phase change materials, it is usually to choose the phase change materials that have a large latent heat value and thus absorb/release more heat during the phase change, thereby obtaining better results. However, the phase change materials often leak or lose due to melting during the phase change when they are applied directly, thus reducing the life of the materials. Microencapsulation is a technique that coats on the surface of one material a trace amount of another material in a shell form. The use of the microencapsulation technique can prevent the phase change material from volume variation and leakage during melting. Furthermore, since the microencapsulated material has small particle size and large specific surface area, it also provides a large heat transfer area.

The encapsulation materials used for the microcapsules are mostly organic polymer materials, which have very low thermal conductivity and thus decrease the rate of heat transfer, though they can prevent the phase change materials from leaking.

SUMMARY

To solve the problem of decreased heat transfer rate due to the low thermal conductivity of the encapsulation materials for microcapsules, the present invention provides a process for preparing a phase change microcapsule having a thermally conductive shell.

To achieve the purpose described above and other purposes, the process for preparing the phase change microcapsule having the thermally conductive shell adds the thermally conductive nano-material in the encapsulation material to increase the thermal conductivity, thereby speeding up the heat release or absorption of the phase change materials, and achieving functions such as effective heat conductance, heat dissipation, energy storage, etc. Also, the vinylsilane compound is polymerized with the acrylic monomer first to form the copolymer, and then the thermally conductive nano-material is added for the polar functional groups on the surface of the thermally conductive nano-material to condense with the vinylsilane compound and form chemical bonding, thereby substantially increasing the compatibility between the thermally conductive nano-material and the copolymer as well as stably dispersing the thermally conductive nano-material in the two-stage process (overall polymerization and emulsion polymerization) for encapsulating the phase change composite materials with the microcapsules. Therefore, the phase change microcapsule having the thermally conductive shell can be prepared and obtained successfully.

The preparation process of the present invention is as the following:

1. The Modification of the Acrylic Monomer

As reaction monomers, the vinylsilane (VS) compound and the acrylic monomer (AM) carries out the polymerization reaction initiated by the peroxide in an organic solvent free environment to form the copolymer (VS-AM copolymer), as shown in the reaction scheme (1) below. The trimethoxyvinylsilane or triethoxyvinyl silane is used as the vinylsilane compound. The acrylic monomer is methyl acrylate, methyl methacrylate, or hydroxyethyl methacrylate.

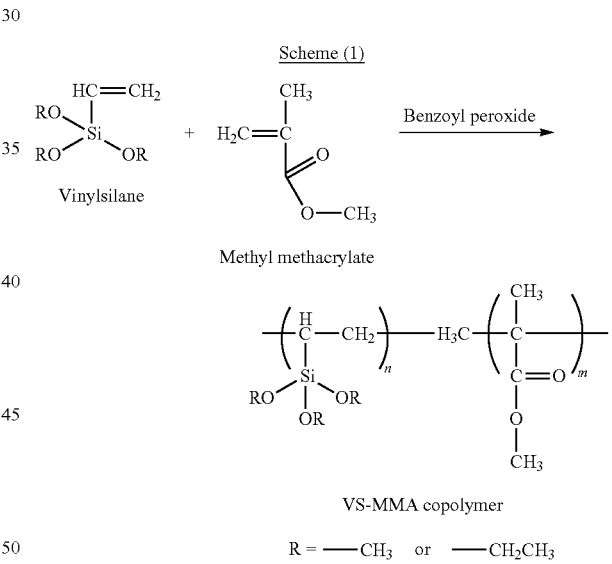

2. Adding Thermally Conductive Nano-Material to Bind with the Modified Acrylic Monomer Add the inorganic nano-powder having high thermal conductivity in the organic material to effectively improve the thermal conductivity of the organic material and prepare the composite material having high thermal conductivity. The inorganic nano-powder comprises aluminum oxide ($Al_2O_3$), aluminum nitride (AlN), boron nitride (BN), or silicon carbide (SiC). The copolymer synthesized by the present study can form chemical bonding with the thermally conductive nano-material, as shown in scheme (2) below, and can enhance the compatibility between the inorganic powder having high thermal conductivity and the organic matrix effectively.

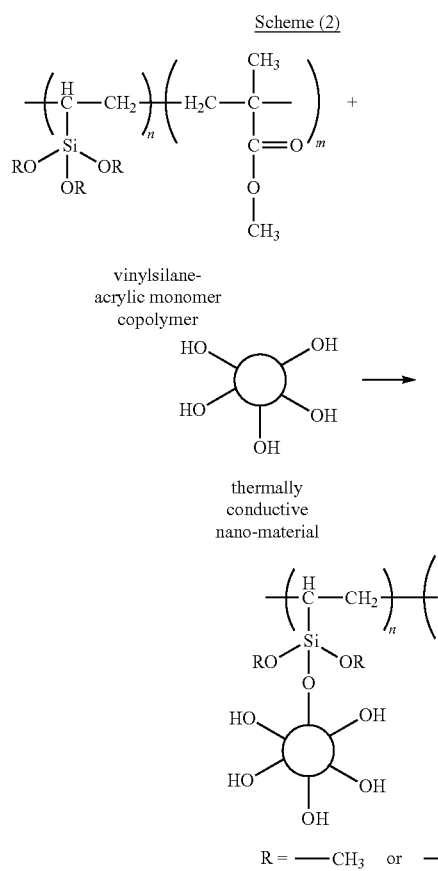

3. The Preparation of the Phase Change Microcapsule Having the Thermally Conductive Shell The phase change microcapsule having the thermally conductive shell uses the phase change material as the core and the copolymerized polymer as the shell, and is prepared by the following process:

(1) As shown in step S110 of FIG. 1, the acrylic monomer and the vinylsilane compound are provided.

(2) As shown in step S120 of FIG. 1, the acrylic monomer and the vinylsilane compound are stirred and mixed to form the first solution, in which the vinylsilane compound is trimethoxyvinylsilane or triethoxyvinyl silane.

(3) As shown in step S130 of FIG. 1, in the mixture mixed in step S120, a trace amount of initiator-benzoyl peroxide is added to proceed with pre-polymerization, which is heated by an oil bath.

(4) As shown in step S140 of FIG. 1, the phase change material is provided.

(5) As shown in step S150 of FIG. 1, dissolve the polyvinyl alcohol in a heated aqueous solution to form the polyvinyl alcohol solution.

(6) As shown in step S160 of FIG. 1, add the phase change material to the polyvinyl alcohol solution prepared in step S150 and heat up to a temperature above the melting point of the phase change material to perform liquefaction and then stir the liquefied solution uniformly.

(7) As shown in step S170 of FIG. 1, mix the PMMA prepolymer resulted from the reaction of step S130 and the solution resulted from the reaction of step S160, and then add ethylene glycol dimethacrylate and the thermally conductive material (such as aluminum nitride, boron nitride, aluminum oxide, or silicon carbide), all of which are stirred and dispersed to form a solution of the phase change microcapsule having the thermally conductive shell.

(8) As shown in step S180 of FIG. 1, add the initiator-benzoyl peroxide to the solution of the phase change microcapsule having the thermally conductive shell formed by step S170, which is then heated by the oil bath to carry out the polymerization of the microcapsule encapsulation material.

(9) As shown in step S190 of FIG. 1, after the treatment of step S180, the microcapsules are ice bathed, centrifuged, and filtered, and then the microcapsules in the lower layer are dried to obtain the phase change microcapsules having the thermally conductive shell.

The phase change material as described in the present invention is the organic phase change material; the organic phase change material is mainly selected from the group consisting of higher aliphatic hydrocarbons, higher fatty acids, higher fatty acid esters, salts of higher fatty acids, higher aliphatic alcohols, aromatic hydrocarbons, aromatic ketones, aromatic amides, and combinations thereof, but is not limited to the organic phase change materials described above.

The higher aliphatic hydrocarbons are usually the aliphatic hydrocarbons containing 6 or more, preferably 6 to 36 carbon atoms; the higher aliphatic alcohols are usually the aliphatic alcohols containing 6 or more, preferably 6 to 36 carbon atoms.

In the preparation process described above, the equivalent proportion of the acrylic monomer to the vinylsilane compound is preferably from 10:1 to 10:3.

In the preparation process described above, the phase change microcapsule is a core-shell material, of which the core material is the organic phase change material.

In the preparation process described above, the phase change microcapsule is a core-shell material, of which the shell material is the copolymer of the vinylsilane compound and the acrylic monomer.

In the preparation process described above, the stirring is preferably using a magnetic stirrer, a motor stirrer, or a homogenizer.

In the preparation process described above, the weight ratio of the phase change material added is from 10 wt % to 40 wt %.

In the preparation process described above, the weight ratio of the inorganic nano-powder having high thermal conductivity (aluminum oxide, aluminum nitride, boron nitride, silicon carbide) added is from 10 wt % to 40 wt %.

In the preparation process described above, the heating temperature in step S130 is preferably in the range from 50° C. to 120° C.

In the preparation process described above, the heating temperature in step S160 is preferably in the range from 40° C. to 80° C.

In the preparation process described above, the heating temperature in step S180 is preferably in the range from 50° C. to 120° C.

The process for preparing the phase change microcapsule having the thermally conductive shell of the present invention can solve the problem of decreased heat transfer rate due to the low thermal conductivity of the encapsulation material conventionally used for microcapsules effectively.

BRIEF DESCRIPTION

DETAILED DESCRIPTION

Figure 1:
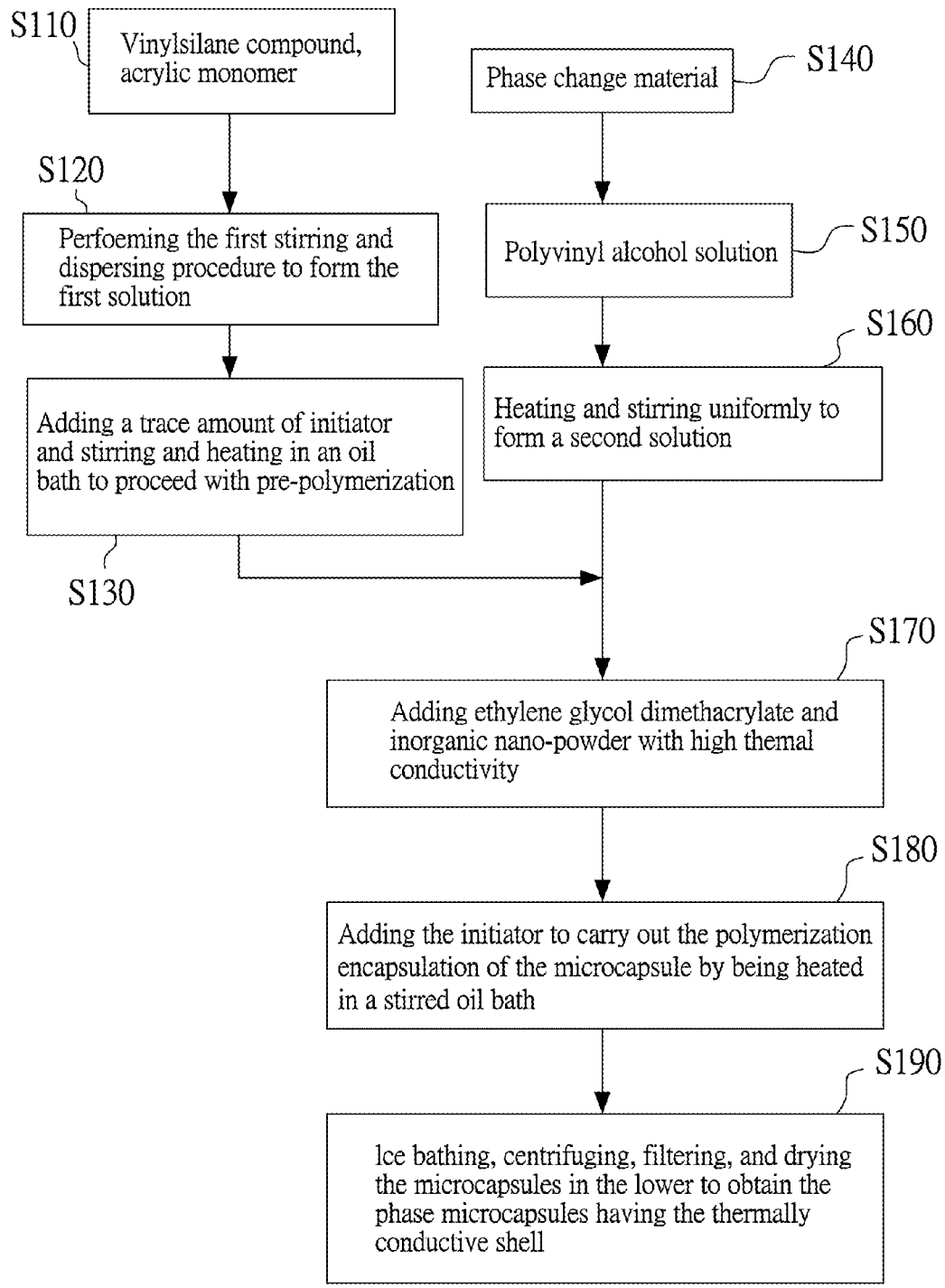
FIG. 1 is the flow diagram of the preparation process of the present invention.

The detailed description of the present invention will be illustrated by specific embodiments below. Other advantages and efficacy of the present invention will be apparent to those skilled in the art from the disclosure of the specification.

Embodiment 1

In the present embodiment, benzoyl peroxide was added in the methyl methacrylate, which was then heated in an oil bath to carry out polymerization and form the prepolymer solution. Paraffin (the organic phase change material) was separately added in the polyvinyl alcohol solution, which was then heated up to a temperature above the melting point of paraffin and stirred uniformly, wherein the weight ratio of paraffin to methyl methacrylate was 1:1. The prepolymer solution was then poured into the polyvinyl alcohol solution and stirred uniformly. Added ethylene glycol dimethacrylate and then stirred uniformly under heating in an oil bath. Took and dried the microcapsules in the upper layer after ice bathing, centrifuging, and filtering procedures to obtain the phase change microcapsules. The thermal conductivity of the microcapsules was measured to be 0.2000 W/mk.

Embodiment 2

In the present embodiment, methyl methacrylate and the vinylsilane compound, trimethoxyvinylsilane, were mixed and heated at 60° C. in an oil bath, wherein the equivalent proportion of methyl methacrylate to trimethoxyvinylsilane was 5:1. Thereafter, benzoyl peroxide was added and then the mixture was heated in an oil bath to carry out polymerization and form the prepolymer solution. Paraffin (the organic phase change material) was separately added in the polyvinyl alcohol solution, which was then heated up to a temperature above the melting point of paraffin and stirred uniformly, wherein the weight ratio of paraffin to methyl methacrylate was 3:1. The prepolymer solution was then poured into the polyvinyl alcohol solution and stirred uniformly. Added ethylene glycol dimethacrylate and then stirred uniformly under heating in an oil bath. Took and dried the microcapsules in the upper layer after ice bathing, centrifuging, and filtering to obtain the phase change microcapsules. The thermal conductivity of the microcapsules was measured to be 0.1988 W/mk; the time needed to raise the temperature of the microcapsules from 30° C. to 80° C. was measured to be 325 seconds; and the time needed to lower the temperature of the microcapsules from 80° C. to 30° C. was measured to be 365 seconds.

Embodiment 3

In the present embodiment, methyl methacrylate and the vinylsilane compound, trimethoxyvinylsilane, were mixed and heated at 60° C. in an oil bath, wherein the equivalent proportion of methyl methacrylate to trimethoxyvinylsilane was 5:1. Thereafter, benzoyl peroxide was added and then the mixture was heated in an oil bath to carry out polymerization and form the prepolymer solution. Paraffin (the organic phase change material) was separately added in the polyvinyl alcohol solution, which was then heated up to a temperature above the melting point of paraffin and stirred uniformly, wherein the weight ratio of paraffin to methyl methacrylate was 1:1. The prepolymer solution was then poured into the polyvinyl alcohol solution and stirred uniformly. Added ethylene glycol dimethacrylate and then stirred uniformly under heating in an oil bath. Took and dried the microcapsules in the upper layer after ice bathing, centrifuging, and filtering to obtain the phase change microcapsules. The thermal conductivity of the microcapsules was measured to be 0.1996 W/mk; the time needed to raise the temperature of the microcapsules from 30° C. to 80° C. was measured to be 303 seconds; and the time needed to lower the temperature of the microcapsules from 80° C. to 30° C. was measured to be 348 seconds.

Embodiment 4

In the present embodiment, methyl methacrylate and the vinylsilane compound, trimethoxyvinylsilane, were mixed and heated at 60° C. in an oil bath, wherein the equivalent proportion of methyl methacrylate to trimethoxyvinylsilane was 5:1. Thereafter, benzoyl peroxide was added and then the mixture was heated in an oil bath to carry out polymerization and form the prepolymer solution. Paraffin (the organic phase change material) was separately added in the polyvinyl alcohol solution, which was then heated up to a temperature above the melting point of paraffin and stirred uniformly, wherein the weight ratio of paraffin to methyl methacrylate was 1:1. The prepolymer solution was then poured into the polyvinyl alcohol solution and stirred uniformly. Added ethylene glycol dimethacrylate and aluminum oxide, and then stirred uniformly under heating in an oil bath, wherein the weight ratio of aluminum oxide added to methyl methacrylate was 1:2. Took and dried the microcapsules in the lower layer after ice bathing, centrifuging, and filtering to obtain the phase change microcapsules having thermally conductive shell of the present invention. The thermal conductivity of the microcapsules was measured to be 0.3535 W/mk; and the time needed to lower the temperature of the microcapsules from 80° C. to 30° C. was measured to be 267 seconds only.

Embodiment 5

In the present embodiment, methyl methacrylate and the vinylsilane compound, trimethoxyvinylsilane, were mixed and heated at 60° C. in an oil bath, wherein the equivalent proportion of methyl methacrylate to trimethoxyvinylsilane was 5:1. Thereafter, benzoyl peroxide was added and then the mixture was heated in an oil bath to carry out polymerization and form the prepolymer solution. Paraffin (the organic phase change material) was separately added in the polyvinyl alcohol solution, which was then heated up to a temperature above the melting point of paraffin and stirred uniformly, wherein the weight ratio of paraffin to methyl methacrylate was 1:1. The prepolymer solution was then poured into the polyvinyl alcohol solution and stirred uniformly. Added ethylene glycol dimethacrylate and aluminum nitride, and then stirred uniformly under heating in an oil bath, wherein the weight ratio of aluminum nitride added to methyl methacrylate was 1:2. Took and dried the microcapsules in the lower layer after ice bathing, centrifuging, and filtering to obtain the phase change microcapsules having thermally conductive shell of the present invention. The thermal conductivity of the microcapsules was measured to be 0.4317 W/mk; the time needed to raise the temperature of the microcapsules from 30° C. to 80° C. was measured to be 159 seconds only; and the time needed to lower the temperature of the microcapsules from 80° C. to 30° C. was measured to be 201 seconds only.

Embodiment 6

In the present embodiment, methyl methacrylate and the vinylsilane compound, trimethoxyvinylsilane, were mixed and heated at 60° C. in an oil bath, wherein the equivalent proportion of methyl methacrylate to trimethoxyvinylsilane was 5:1. Thereafter, benzoyl peroxide was added and then the mixture was heated in an oil bath to carry out polymerization and form the prepolymer solution. Paraffin (the organic phase change material) was separately added in the polyvinyl alcohol solution, which was then heated up to a temperature above the melting point of paraffin and stirred uniformly, wherein the weight ratio of paraffin to methyl methacrylate was 1:1. The prepolymer solution was then poured into the polyvinyl alcohol solution and stirred uniformly. Added ethylene glycol dimethacrylate and boron nitride, and then stirred uniformly under heating in an oil bath, wherein the weight ratio of boron nitride added to methyl methacrylate was 1:2. Took and dried the microcapsules in the lower layer after ice bathing, centrifuging, and filtering to obtain the phase change microcapsules having thermally conductive shell of the present invention. The thermal conductivity of the microcapsules was measured to be 0.4258 W/mk; the time needed to raise the temperature of the microcapsules from 30° C. to 80° C. was measured to be 175 seconds only; and the time needed to lower the temperature of the microcapsules from 80° C. to 30° C. was measured to be 226 seconds only.

Figure 3:
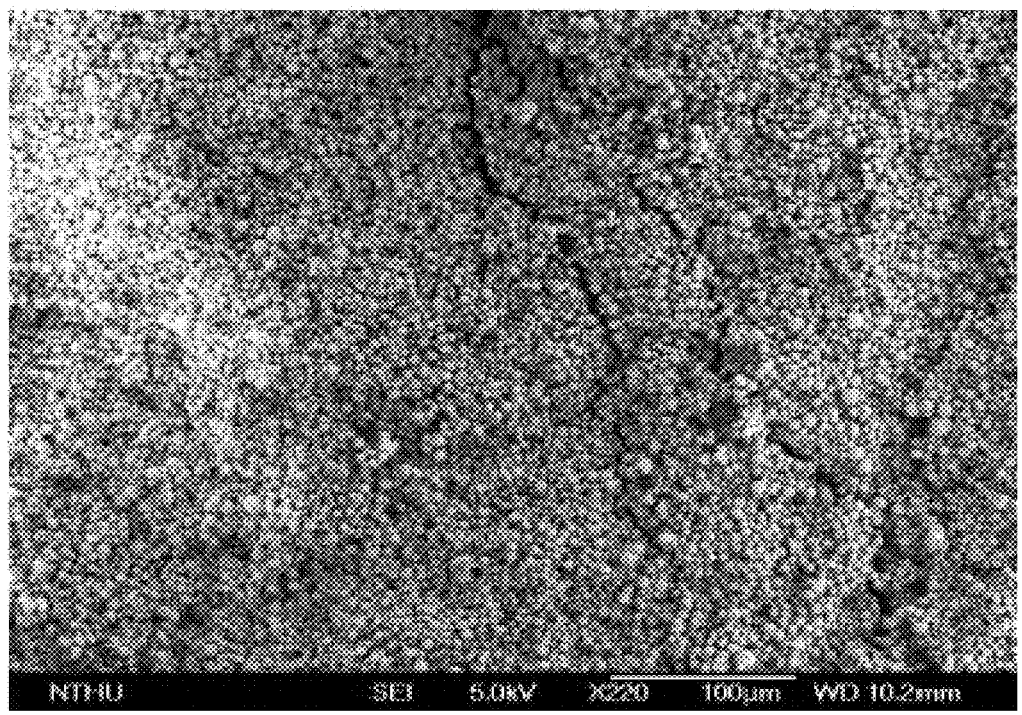
FIG. 3 is an analysis image of the embodiment of the present invention taken with a scanning electron microscope.
Figure 4:
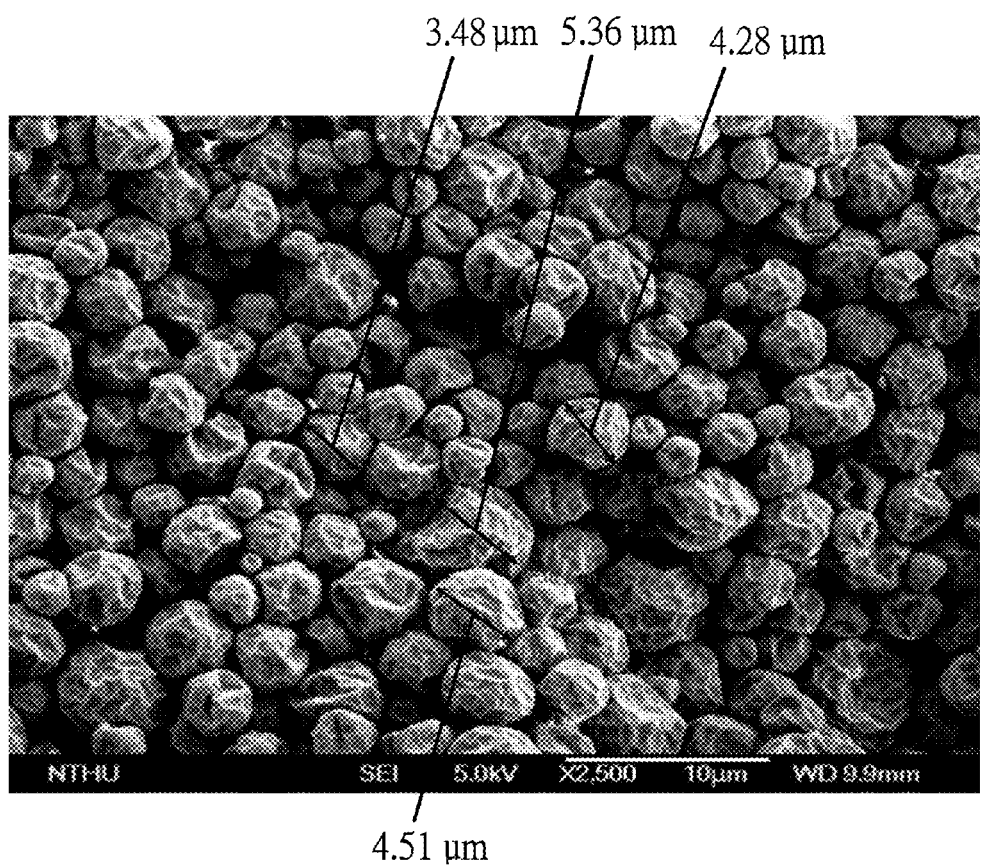
FIG. 4 is an analysis image of the embodiment of the present invention taken with a scanning electron microscope.

The phase change microcapsules having thermally conductive shell made in Embodiments 1-5 described above are shown in FIGS. 2-4, in which FIG. 2 is the structure diagram of the phase change microcapsule having the thermally conductive shell of the present invention; FIG. 3 is an analysis image of the embodiment of the present invention taken with a scanning electron microscope; and FIG. 4 is an analysis image of the embodiment taken with a scanning electron microscope.

Figure 2:
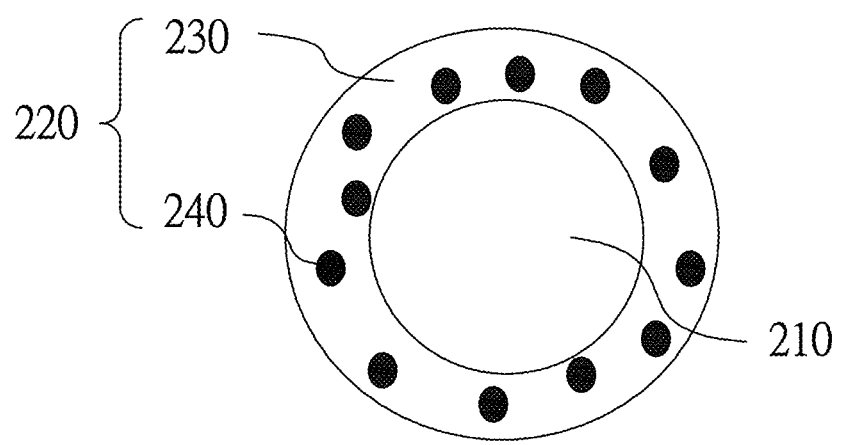
FIG. 2 is the structure diagram of the phase change microcapsule having the thermally conductive shell of the present invention.

As shown in FIG. 2, the phase change microcapsule having the thermally conductive shell of the present invention comprises the phase change material 210; and the thermally conductive shell 220 encapsulating the phase change material 210, wherein the thermally conductive shell 220 comprises the copolymer of vinylsilane compound and the acrylic monomer 230 and the thermally conductive material 240.

Although the present invention have been disclosed by the preferred embodiments hereinabove, those skilled in the art should appreciate that those embodiments are used for illustrating the present invention only and should not be construed as limitations on the scope of the present invention. It is noted that, all the equivalent variations and substitutions made to those embodiments are deemed to be included within the scope of the present invention. Therefore, the scope of the present invention is defined by the claims.

What is claimed is:

1. A process for preparing a phase change microcapsule having a thermally conductive shell, comprising the steps of:
(A) providing a vinylsilane compound;
(B) adding to the vinylsilane compound an acrylic monomer and a trace amount of initiator—benzoyl peroxide, which are stirred and heated in a oil bath to carry out a prepolymerization reaction and form a first solution;
(C) adding a phase change material to a polyvinyl alcohol solution, which is then heated up to a temperature above the melting point of the phase change material to perform liquefaction and stirred uniformly, thereby forming a second solution;
(D) adding the second solution to the first solution and stirring uniformly; and
(E) adding ethylene glycol dimethacrylate and inorganic nano-powder, and then adding the initiator—benzoyl peroxide to carry out the polymerization encapsulation of the microcapsule by being heated in a stirred oil bath and obtain the phase change microcapsule having the thermally conductive shell;
wherein the inorganic nano-powder is selected from aluminum oxide, aluminum nitride, boron nitride, silicon carbide, or combinations thereof;
wherein the phase change microcapsule is a core-shell material, of which the shell material is a copolymer of the vinylsilane compound and the acrylic monomer;
wherein the equivalent proportion of the acrylic monomer to the vinylsilane compound is from 10:1 to 10:3;
wherein the acrylic monomer is methyl acrylate, methyl methacrylate, or hydroxyethyl methacrylate.

2. The process for preparing a phase change microcapsule having a thermally conductive shell according to claim 1, wherein the vinylsilane compound is trimethoxyvinylsilane or triethoxyvinyl silane.

3. The process for preparing a phase change microcapsule having a thermally conductive shell according to claim 1, wherein the phase change microcapsule is a core-shell material, of which the core material is an organic phase change material.

4. The process for preparing a phase change microcapsule having a thermally conductive shell according to claim 1, wherein the phase change material is an organic phase change material, which is selected from the group consisting of higher aliphatic hydrocarbons, higher fatty acids, higher fatty acid esters, salts of higher fatty acids, higher aliphatic alcohols, aromatic hydrocarbons, aromatic ketones, aromatic amides, and combinations thereof.

5. The process for preparing a phase change microcapsule having a thermally conductive shell according to claim 1, wherein the stirring is carried out by a magnetic stirrer, a motor stirrer, or a homogenizer.

6. The process for preparing a phase change microcapsule having a thermally conductive shell according to claim 1, wherein the weight ratio of the phase change material added is from 10 wt % to 40 wt %.

7. The process for preparing a phase change microcapsule having a thermally conductive shell according to claim 1, wherein the weight ratio of the inorganic nano-powder added is from 10 wt % to 40 wt %.

8. The process for preparing a phase change microcapsule having a thermally conductive shell according to claim 1, further comprising a step of: (F) ice bathing, centrifuging, filtering, and drying the phase change microcapsule having the thermally conductive shell.

9. The process for preparing a phase change microcapsule having a thermally conductive shell according to claim 1, wherein the heating temperature in step (B) is in the range from 50° C. to 120° C.

10. The process for preparing a phase change microcapsule having a thermally conductive shell according to claim 1, wherein the heating temperature in step (C) is in the range from 40° C. to 80° C.

11. The process for preparing a phase change microcapsule having a thermally conductive shell according to claim 1, wherein the heating temperature in step (E) is in the range from 50° C. to 120° C.

* * * * *